United States Patent [19]
Hashimoto et al.

[11] 3,798,838
[45] Mar. 26, 1974

[54] METHOD OF IRRIGATION AND FERTILIZATION

[75] Inventors: Saburo Hashimoto; Yorba Linda; Burton B. Sandiford, all of Placentia, Calif.

[73] Assignee: Union Oil Company of California, Los Angeles, Calif.

[22] Filed: Aug. 23, 1972

[21] Appl. No.: 283,182

[52] U.S. Cl............... 47/58, 47/DIG. 10, 260/29.6, 61/36
[51] Int. Cl............................................. E02d 3/12
[58] Field of Search ................ 61/36; 260/29.6, 41; 166/295; 47/58, DIG. 10

[56] References Cited
UNITED STATES PATENTS

| | | | |
|---|---|---|---|
| 3,677,014 | 7/1972 | Stout et al. | 61/36 |
| 3,633,310 | 1/1972 | Sandiford | 47/58 |
| 3,056,757 | 10/1962 | Rakowitz | 260/29.6 |
| 2,625,529 | 1/1953 | Hedrick et al. | 260/41 |
| 3,308,885 | 3/1967 | Sandiford | 166/295 |
| 3,687,200 | 8/1972 | Routson | 166/295 X |

*Primary Examiner*—Robert E. Bagwill
*Attorney, Agent, or Firm*—Robert E. Strauss

[57] ABSTRACT

Fertilization and irrigation of highly permeable surface soils in semi-arid regions is described wherein the soils are contacted with an aqueous solution of a water soluble plant nutrient salt and an effective amount of a partially hydrolyzed polyacrylamide to reduce the permeability of the soil without rendering it impermeable to water flow. It has been found that water soluble plant nutrients and the aforementioned partially hydrolyzed polyacrylamide exhibit a synergistic effect to decrease the water permeability of the soils. It has also been found that plants grow better in the treated soil and are more efficient in uptake of nutrients from the soil. These discoveries can be used to conserve water and fertilizer and improve the efficiency of agronomy by contacting the soil with a solution having a concentration of from 0.001 to about 1 weight percent of a polyacrylamide having from 5 to about 80 percent of its amide groups hydrolyzed to carboxylic acid groups and from 0.001 to 5 weight percent of a water soluble, plant nutrient salt.

7 Claims, No Drawings

METHOD OF IRRIGATION AND FERTILIZATION

DESCRIPTION OF THE INVENTION

This invention relates to a treatment of agricultural soils and in particular relates to a treatment of highly permeable surface soils to reduce the water permeability thereof and thereby reduce loss of irrigation water and water-soluble fertilizers from the root zone.

Sandy and highly water-permeable soils are encountered in irrigation since many of these soils have been reclaimed by irrigation from arid and semi-arid land. Fertilization of these soils with water-soluble fertilizers frequently results in a rapid leaching of the fertilizer by rainfall or irrigation water as it percolates away from the root zone. This loss is particularly prevalent in conventional furrow irrigation methods wherein irrigation water is applied at one end of the field and permitted to flow along furrows which are between the rows of the plants in the fields. The water also flows vertically through the soil and a large portion of the water is lost because it percolates beneath the root zone, particularly at the inlet of the water to the field. Other investigators have reported that studies made on furrow irrigation over several seasons in a semi-arid region reveal that approximately half of the water was lost because of its percolation below the root zone. This water was found to have removed approximately 90 pounds of nitrogen per acre as water-soluble nitrates each season. Attempts made to reduce the losss of water and fertilizer by reducing the total volume of water applied during irrigation did not have any significant effect on the losses even when the water supply was curtailed until it had a deleterious effect on the crop.

The loss of the water soluble fertilizers is inefficient and can present problems to the environment. The nitrogen is removed as water soluble nitrate salts and these salts are eventually leached into the underground water streams. These streams are a source of potable water for man and animals and potable water has a limit to the amount of nitrates which can be tolerated. Ruminants and infants are particularly susceptible to nitrate toxicity since they possess the reducing bacteria in their digestive systems which can reduce innocuous nitrates to nitrites. The latter complex with hemoglobin can cause methemoglobinemia. The underground water streams also enter rivers, ponds and lakes and if they contain an objectionably high content of nitrates, they can contribute to eutrophication or toxicity to wild life.

Accordingly, it is desirable that more efficient methods of irrigation and fertilization be developed and, in particular, methods be developed which obviate any adverse side effect that conventional fertilization practice may have on the ecology.

OBJECTS

It is, therefore, an object of this invention to provide a method for the irrigation of surface soils which does not result in a high loss of irrigation water or fertilizers from the soil.

It is a further object of this invention to provide a method for fertilization and irrigation of soils which has a greatly reduced loss of water and fertilizers from the root zone of plants established in the soils.

Other and related objects will be apparent from the following paragraphs.

BRIEF DESCRIPTION OF THE INVENTION

We have now found that the water permeability of highly water-permeable soils can be markedly reduced by contacting the soils with an aqueous solution of a water soluble, partially hydrolyzed polyacrylamide to reduce the water permeability of the soil without rendering it impermeable to water flow. In particular, we have found that the application of the aforementioned polyacrylamide in an aqueous solution of a water soluble nitrogenous plant nutrient results in a synergistic action by the nutrient and the polymer to reduce the water permeability of the soil far below the reductions which can be achieved by treatment with aqueous solutions of either of the aforementioned materials. We have also found that the use of minor amounts of the water soluble partially hydrolyzed polyacrylamide increases the nutrient uptake by the plant and the treatment of this invention cna actually increase the growth of plants and their efficiency in utilizing nitrogenous fertilizers.

It is believed that the plant nutrients in the aqueous solution are dissociated and the resultant ions function to alter the rheology of the polymer solution in the soil. Regardless of the exact mechanism by which the regarded permeability is achieved, we have found that this synergism occurs for the plant nutrients and the polymers described hereinafter and that this effect remains in the treated soil following such treatment.

POLYMERS USED IN THE INVENTION

The polymers useful in the invention comprise partially hydrolyzed polyacrylamide which is obtained by the polymerization, preferably homopolymerization, of acrylamide. If desired, however, up to about 10 weight percent of other vinyl monomers such as vinyl acetate, acrylonitrile, methacrylonitrile, vinyl alkyl ethers, vinyl chloride and the like can be employed, provided that the copolymers so obtained are characterized by water solubility and freedom from crosslinking. The acrylamide is polymerized by suitable vinyl polymerization initiators, e.g., free radical forming compounds such as the azo compounds, e.g., azobisisobutyronitrile, azobisisobutyroamidine chloride, etc.; peroxides such as hydrogen peroxide, sodium peroxide, benzoyl peroxide, alkyl peroxides such as t-butyl hydrogen peroxides; and dialkyl peroxides such as diethylperoxides, di-t-butyl peroxide, etc.; alkali metal persulfates, etc.

These polymers are characterized by high molecular weight, e.g., 300,000 to about 15,000,000, preferably from about 500,000 to about 5,000,000. Generally, the higher the molecular weight, the more effective is the polymer in reducing water permeability. The maximum polymer size is limited, however, by the tendency of excessive large macromolecules to seal the soil and stop water penetration. This limiting molecular weight is from 15,000,000 to about 20,000,000. The viscosity of aqueous solutions of the polymers is reflective of the molecular weight of the polymers, higher molecular weight polymers imparting greater viscosities at the same concentrations than that of the lower molecular weight polymers. The minimum moelcular weight for the polymers used in this invention is sufficient that a 0.5 weight percent aqueous solution of the polymer has a viscosity of at least about 6 centipoises at 25°C. as determined in a standard Ostwald viscosimeter.

For use in the invention, the polyacrylamide polymers are partially hydrolyzed to the extent that from 5 to about 70, preferably from about 7 to about 65, and most preferably from about 12 to about 45 percent of the amide groups of the polymer are hydrolyzed to carboxylic acid or water soluble carboxylate groups. Generally, the greater the degree of hydrolysis, the more effective is the polymer in imparting a residual reduction in water permeability of the soil. The maximum degree of hydrolysis is limited by the stability of the polymer, attempts to obtain greater than about 70 percent hydrolysis usually resulting in degradation of the polymer. A disclosure of the effectiveness of polymers having from 0.1 to about 35 percent hydrolysis in imparting a residual reduction in water permeability of sand can be found in my prior U.S. Pat. No. 3,308,885. The data in this patent evidence an increasing effectiveness of the polymer in imparting a residual reduction in water permeability to sand. Accordingly, it is desirable to use polymers having the maximum degree of hydrolysis without encountering any objectionable degradation of the polymer chain. The acid groups resulting on the polymer from the hydrolysis can be present as the carboxylic acid or as water soluble carboxylates such as the ammonium, alkali metal and alkaline earth metal salts thereof, e.g., sodium, potassium, cesium, lithium, calcium, magnesium, etc.

The hydrolysis of the polyacrylamide can be performed after the preparation of the polymer by prolonged exposure of an aqueous solution of the polymer to elevated temperatures and pH in the presence of alkali metal hydroxides or carbonates. It is similarly possible to prepare the partially hydrolyzed polyacrylamide by a step of simultaneously polymerizing and hydrolyzing the resultant polymer. Such a method is described in U.S. Pat. No. 3,022,279 wherein an aqueous solution containing at least about 5 percent by weight of acrylamide, a free radical polymerization initiator and sodium carbonate at a concentration of from 10 to 67 molar percent of the acrylamide are heated to a temperature from about 20° to 55°C. to initiate the polymerization and simultaneously polymerize and hydrolyze the polymer to the desired partially hydrolyzed composition. Another technique for the simultaneous polymerization and hydrolysis of the polymer comprises performing the polymerization with an aqueous solution containing at least about 5 percent acrylamide and an alkali metal polyphosphate in an amount from about 5 to 25 molar percent based on the acrylamide using a free radical catalyst initiator and a temperature from about 25° to 80°C. to initiate the polymerization while retaining the resultant solution at the elevated temperature for a sufficient time to hydrolyze from 5 to about 80 percent of the amide groups to the carboxylic or carboxylate groups. The necessary time to effect the hydrolysis whether it is performed concurrently with or after the polymerization of the acrylamide is from about 5 to about 20 hours, preferably from about 8 to about 12 hours, and is sufficient to effect the aforementioned partial hydrolysis of the acrylamide groups. The partially hydrolyzed polymers are also commercially available as dried powders under the trade designations of Separan NP20, Pusher 500 or 700, ET601, from the Dow Chemical Company; Calgon 454 or WC-500 from the Calgon Corporation; or Uni-Perm or Hi-Vis from Betz Laboratories.

APPLICATION OF THE POLYMER

The amount of aqueous solution of polymer that is applied to the soil in any single treatment can comprise from about 0.05 to 5, preferably from 0.1 to 2 volumes per pore volume of soil which is to be treated. The solution can be applied in the conventional irrigation practice at a rate to wet the soil without encountering any substantial runoff of water from the field.

The partially hydrolyzed polyacrylamide is employed in an aqueous solution which contains from about 0.001 to about 2 weight percent, preferably from 0.001 to 1 weight percent and, more preferably, from 0.001 to 0.3 weight percent of the polymer. At this concentration the polymer will exhibit a viscosity from 2 to about 1,000 centipoises. Most preferably, the concentration is from 0.001 to about 0.1 weight percent and, at this concentration, the effectiveness of the polymer is substantially greater than would be predicted from its solution viscosity. To illustrate, a solution of this low polymer content with a plant nutrient has a mobility in soil comparable to a solution of the polymer alone which has a concentration sufficient to give a viscosity 15 to 50 times greater than that of the solution containing the plant nutrient.

The polymer can be dissolved in ordinary irrigation water by simple admixing of the polymer with the irrigation water or, preferably, the polymer is dissolved in an aqueous concentrate having a concentration from about 0.5 to about 2.0 weight percent of the polymer and thereafter this concentrate can be blended into the irrigation water in a sufficient quantity to provide the aforementioned desired concentration of the polymer in the solution which is contacted with the surface soil.

THE PLANT NUTRIENT

Any of the well known and conventional water soluble nitrogenous nutrients can be used in practice of this invention. These nutrients are applied in response to the plants' requirements for plant nutrients and in proportion to such demands. A major proportion of the applied fertilizers will, of course, be a nitrogenous nutrient. Suitable nitrogenous nutrients include the water soluble nitrates and, in particular, ammonium nitrate, potassium nitrate, calcium nitrate, as well as the nitrate salts of the various metallic elements known as trace elements, e.g., the nitrates of copper, iron, zinc, manganese, cobalt and magnesium. Other nitrogenous fertilizers include water soluble ammonium salts such as ammonium chloride, ammonium sulfate, monoammonium hydrogen phosphate, diammonium hydrogen phosphate, ammonium polyphosphates such as ammonium pyrophosphate, ammonium tripolyphosphate, etc. These ammonium salts can also furnish the sulfur and phosphorus requirements of the plants.

APPLICATION OF THE PLANT NUTRIENT

The aforementioned water soluble plant nutrients can be applied dissolved in the aqueous solutions of the polymer at a concentration sufficient to effect the application of from 5 to about 5,000 pounds per acre of the particular fertilizer per season. In general, the seasonal requirements for crops in most soils is that from 50 to about 2,000 pounds, preferably from about 100 to about 1,000 pounds, of nitrogen in the form of a water soluble nitrogenous fertilizer be applied per acre of soil. The seasonal requirements for phosphorus expressed as $P_2O_5$ are from 10 to about 800, preferably from 60 to about 200, pounds per acre. The seasonal requirements for potassium expressed as $K_2O$ generally are from 10 to about 500, preferably from 50 to about 200, pounds per acre and the seasonal requirements for sulfur are from 10 to about 3,000, preferably from 10 to about 1,000, pounds per acre. The preceding amounts are set forth as ranges that cover the widely divergent requirements for particular crops, soils and environments. Those skilled in agronomy and knowledgeable with these factors can readily prescribe the exact requirements for any particular application.

The plant nutrients are applied throughout the growing season in amounts adequate to supply the immediate demands of the plant for such fertilizer. This demand will fluctuate throughout the growing season and will be the heaviest at the time when the plants are in a young healthy growing condition and will decrease as the plants reach maturity. The demand will also be at a reduced level during the germination and early growth of the plants. The concentration of the nutrient in the water can vary during any single treatment. The concentration can be high at first and then diminished or the salt can thereafter be completely eliminated provided that an adequate amount of nutrient has been added to supply the plants' nutrient requirements. The preferred practice of the invention is to dissolve the nutrients and the polymer in the irrigation water, the concentration of the nutrient being proportioned to the requirements of the nutrient by the plants. When the nutrient is added to all the irrigation water, the concentration of the plant nutrient in the irrigation water can be between about 0.002 and 0.2 weight percent, preferably between about 0.0035 and 0.05 weight percent.

Alternatively, the fertilizer can be broadcast or applied to the soil in an undissolved or dry state and the field can thereafter be irrigated with the aqueous polymer solution. The irrigation water will dissolve the nutrient, thereby forming a solution of the nutrient and the polymer and wash them into the soil surrounding the roots of the plant, i.e., the root zone. In this manner the fertilizer can be applied at intervals of from one to about five times per growing season, preferably from about two to about three times, and at least one of these applications can precede the irrigation with an aqueous solution of the partially hydrolyzed polyacrylamide.

APPLICATION OF THE SOLUTION TO THE SOIL

The treatment can be used in conjunction with conventional irrigation practice. The treatment provides the maximum benefits when used with furrow irrigation. This irrigation is commonly practiced where rows of crops are established in fields with furrows in the soil between the rows. The rows are customarily 2 to about 24 inches in depth and extend between the rows of plants in the field. Typically, the furrows extend for 2 to about 8 feet between the irrigation sites, i.e., the points where headers are present for the delivery of the irrigation water to the furrows. Citrus groves commonly have border irrigation furrows at 20 to 50 feet intervals.

Irrigation water applied to the soil must flow the entire length of the furrows to insure adequate watering of the plants which are at the end of the irrigation furrows. The period of time to effect this flow of water across the surface of the soil is sufficiently long that there also occurs an unavoidable loss of water by its downward percolation through the soil in the vicinity of the irrigation header. This invention will effectively prevent such downward flow or greatly diminish the amount of water which is lost by such percolation since the polymer and, particularly, the combination of the polymer with a water soluble, plant nutrient salt substantially reduces the permeability of the soil to the water and insures that more of the water flows across the surface of the soil than permeates and percolates through the soil to a depth below the root zone.

The invention can also be used with other methods of irrigation such as the conventional sprinkler irrigation where the water is distributed as a spray over the surface of the soil. Commonly, most sprinklers do not obtain even distribution of the water but, instead, a higher concentration of water is applied adjacent the sprinkler and this dosage of water diminishes as the distance from the sprinkler is increased. When the polymer and a water soluble plant nutrient salt are applied in the irrigation water, a greatly reduced permeability of the soil to the solution results. Consequently, percolation of the water downwardly from the area adjacent the sprinkler is reduced and a greater amount of the water will flow along the surface of the soil and be distributed evenly in the field.

After treatment with the solution of polymer and plant nutrient salt, conventional irrigation can be follows and it will be observed that the soil has a residual decreased permeability to water. During a growing season in an arid or semi-arid region, plants require approximately 2 to about 15 feet of water per year, which is applied as necessary to maintain the water content of the soil above the minimum amount corresponding to the permanent wilting value.

THe necessity for irrigation can be determined as in the conventional practice, e.g., by the use of field instruments for the determination of the moisture content of the soil in the root zone of the plants, e.g., in the upper 18 inches, preferably the upper 6 inches of soil. Instruments are available to determine the moisture content by measurement of the soil suction pressure which ranges from about 0.85 to 15 bars, the 15-bar value reflecting the permanent wilting point of most soils. An electrode type resistance unit suitable for measurement of soil moisture content independently of the physical characteristics of the soil is described in "Soil Science", Volume 97, pages 108–112.

The preferred embodiment of the invention comprises the application to the soil of an aqueous solution of the water soluble, plant nutrient salt and the polymer. In these applications, each of the individual components, i.e., the polyacrylamide and the water soluble plant nutrient salt are added in their aforestated concentrations to the water and the resulting solution is applied to the soil in the amount sufficient to insure adequate distribution of the water in the field without encountering runoff. It will be found that in such application the tendency of the aqueous solution of polymer and plant nutrient salt as well as of subsequent irrigation waters to percolate into the soil away from the root zone will be greatly inhibited.

The following results will illustrate modes of practice of the invention and serve to demonstrate results obtainable thereby:

EXAMPLE 1

A field investigation on the use of the invention is conducted in a cotton field. Four rows, approximately 130 feet in length, are used for the irrigation tests. Between the rows of cotton, the field has irrigation furrows which are 8 inches in depth and 30 inches wide. The soil is sampled at the first 10 feet, at the midportion and at the last 30 feet of each row and these sample points are identified as locations 1, 2 and 3, respectively.

In the investigation the rows are treated with irrigation water as follows:

| Row | Treatment |
|---|---|
| 1 and 3 | Tap water containing 1.15 percent calcium nitrate. |
| 2 and 4 | Tap water containing 1.15 percent calcium nitrate and 70 ppm polyacrylamide having an average molecular weight between 6 and 10 million and 20 to 30 percent of its amide groups hydrolyzed. |

Samples of the soil are taken at each of the sample locations immediately after the first application of the solutions and after 1 week and 3 and 6 weeks following treatment. Two samples are taken at each location, one sample at a depth from 6 to 12 inches below the surface and the second sample at a depth 18 to 24 inches below the surface. All the samples are analyzed for nitrate content.

Before the start of the test, the background level of nitrate in the soil was determined by analysis to be from 9 to 41 parts per million with an average value of 21 parts per million. This average value is subtracted from the nitrate determination of each sample so that the results which are reported herein represent the net nitrate content in the soil resulting from the treatment.

The following Table represents the results of nitrate content for the rows receiving treatment with calcium nitrate alone and receiving the combination of calcium nitrate and polymer:

TABLE 1

| Sample Position | Solution | Sample Depth | Soil Nitrogen After: One Week | Three Weeks | Six Weeks |
|---|---|---|---|---|---|
| 1 | $Ca(NO_3)_2$ | 6-12 | 45 | 18 | 16 |
| 1 | $Ca(NO_3)_2$ +polymer | 6-12 | 80 | 110 | 79 |
| 1 | $Ca(NO_3)_2$ | 18-24 | 30 | 110 | 79 |
| 1 | $Ca(NO_3)_2$ +polymer | 18-24 | 1 | 35 | 30 |
| 2 | $Ca(NO_3)_2$ | 6-12 | 32 | 25 | 3 |
| 2 | $Ca(NO_3)_2$ +polymer | 6-12 | 75 | 45 | 8 |
| 2 | $Ca(NO_3)_2$ | 18-24 | 1 | 3 | 1 |
| 2 | $Ca(NO_3)_2$ +polymer | 18-24 | 1 | 18 | 1 |
| 3 | $Ca(NO_3)_2$ | 6-12 | 8 | 18 | 15 |
| 3 | $Ca(NO_3)_2$ +polymer | 6-12 | 40 | 110 | 32 |
| 3 | $Ca(NO_3)_2$ +polymer | 18-24 | 1 | 82 | 1 |
| 3 | $Ca(NO_3)_2$ +polymer | 18-24 | 2 | 110 | 75 |

These data revel that the polymer substantially reduced the vertical percolation of the water. Thus, at sample position 1 which is nearest to the water inlet to the field, the nitrogen content of the soil treated with polymer and calcium nitrate at the 6 to 12 inch depth greatly exceeded that receiving only calcium nitrate; see the first two rows of the table. In contrast, the soil treated with calcium nitrate alone had the greater nitrogen content at the 18 to 24 inch interval, a result pf greater percolation of the water into the soil; see the third and fourth rows of data in the table. Most of this nitrogen would be lost with most plants since it is beneath the plants' root zone.

The remaining data, collected at sample positions down the row from the water inlet, reflect similar behavior. These data additionally evidence that the rows receiving the solution of polymer and calcium nitrate were more uniformly fertilized as evidenced by the greater nitrogen contents of these rows when compared to the rows treated with a solution of calcium nitrate only.

EXAMPLE 2

A series of experiments were performed to determine the effect on soil permeability to water of various treatments with plant nutrient salts and/or a partially hydrolyzed polyacrylamide.

Laboratory core studies were performed by packing dried, field soil in a tube of Lucite, 1 inch in diameter and 2 feet in length. The resultant core was evacuated for approximately one hour and then saturated with a synthetic tap water comprising distilled water containing 500 ppm sodium chloride. The synthetic water was used throughout the experiment to provide a consistency in the water that was not possible with the daily variation in tap water.

The permeability of the soil was measured by passing the water through the core at a differential pressure of 3 psig. The time for flowing 50 milliliters through the core was 12 minutes and 12 seconds. Thereafter an aqueous solution containing 0.3 percent calcium nitrate and 50 ppm of polyacrylamide having an average molecular weight between 6 million and 10 million and having 20 to 30 percent of its amide groups hydrolyzed was passed through the core at the same differential pressure. A total of 10 milliliters of the solution passed through in a period of 6 minutes 3 seconds. The flow rate was again measured with the water and the time required for 10, 20, 30, 40 and 50 milliliters of flow was measured and the following results were obtained:

TABLE 2

| Water Flow Quantity | Time |
|---|---|
| 10 ml | 29 minutes, 30 seconds |
| 20 | 72 minutes, 15 seconds |
| 30 | 116 minutes, 20 seconds |
| 40 | 162 minutes, 27 seconds |
| 50 | 185 minutes, 28 seconds |

These data evidence a greatly decreased permeability of the soil to water since after the treatment, the time to flow 50 milliliters of water through the core was 15 times longer than the time required before treatment. This would result in a soil having a greater resistance to percolation of water and leaching of fertilizer salts.

The experiment was repeated with a fresh core sample of the dried, field soil which was saturated with the synthetic tap water. The time for the passage of 50 milliliters of the water through the soil at the 3 psi pressure differential was measured and found to be 1 minute and 36 seconds. Thereafter, 10 milliliters of an aqueous solution of 0.3 weight percent calcium nitrate in the water was passed through the core over a period of 17 seconds at the differential pressure of 3 psig. The flow rate of the water through the core was again measured and the following results were obtained at the various increments of flow rates:

TABLE 3

| Water Flow Quantity | Time |
|---|---|
| 10 ml | 17 seconds |
| 20 | 35 seconds |
| 30 | 55 seconds |
| 40 | 1 minute, 15 seconds |
| 50 | 1 minute, 37 seconds |

These data indicate that treatment with a solution of calcium nitrate, alone, did not decrease the soil's permeability to water since the flow rates of water through the core, before and after treatment, were identical.

The experiment was repeated with a fresh core packed with the dried, field soil. The synthetic tap water was passed through the core at a pressure differential of 3 psig and it is observed that the time for 50 milliliters of water to pass through the core was 2 minutes and 51 seconds. The core was then treated with 10 milliliters of a solution of 50 ppm of a partially hydrolyzed polyacrylamide in the water. This quantity of solution passed through the core in 45 seconds. Thereafter, 50 milliliters of the water was passed through the core and the time for the various following increments of flow was observed:

TABLE 4

| Water Flow Quantity | Time |
|---|---|
| 10 ml | 33 seconds |
| 20 | 1 minute, 7 seconds |
| 30 | 1 minute, 39 seconds |
| 40 | 2 minutes, 14 seconds |
| 50 | 2 minutes, 48 seconds |

These data show that while the polymer solution had a lower mobility in the soil than the water; 45 seconds for 10 milliliters to flow through the core against 33 seconds for water; no residual effect on water permeability was observed and the subsequent flow of water was as rapid after treatment as before. The failure to achieve a residual reduction in water permeability of the sand when treated with the polymer solution alone indicated that the polymer had been used in less than the effective amount to achieve the residual reduction for the soil under study. A residual effect could have been attained by increasing the amount of polymer either by increasing its concentration in the solution or by increasing the amount of solution used to treat the soil.

The experiment was repeated with a fresh core of dried, field soil and the flow rate of the synthetic tap water was measured and found to be 8 minutes and 58 seconds for 50 milliliters. The soil was then treated with 10 milliliters of 0.3 weight percent ammonium nitrate and 50 ppm of the partially hydrolyzed polyacrylamide in the water. The time required for 10 milliliters of this solution to flow through the core was 5 minutes and 10 seconds. Thereafter, the core was treated with 50 milliliters of the water and the flow rates indicated in the following table are recorded for each increment of flow:

TABLE 5

| Water Flow Quantity | Time |
|---|---|
| 10 ml | 7 minutes, 43 seconds |
| 20 | 16 minutes, 3 seconds |
| 30 | 23 minutes, 57 seconds |
| 40 | 31 minutes, 27 seconds |
| 50 | 39 minutes, 4 seconds |

These data evidence a greatly reduced permeability of the soil to subsequent water flow since the time to flow 50 milliliters of water through the core was increased over four-fold as a result of the treatment with the solution of polymer and ammonium nitrate.

The preceding experiments clearly demonstrate that the combination of the fertilizers and the partially hydrolyzed polyacrylamide result in a synergistic effect on the permeability of the soil to the aqueous solutions. The treatment of the soil with solutions of calcium nitrate, polymer or ammonium nitrate, alone, did not appreciably affect the permeability of the soil to water after the treatments. The treatment of the soil with solutions of the partially hydrolyzed polyacrylamide and ammonium nitrate or the partially hydrolyzed polyacrylamide and the calcium nitrate, however, resulted in significantly lower permeability of the soil to water flow.

EXAMPLE 3

The effect of the use of the aqueous solution of the polymer and a plant nutrient was determined in a greenhouse study.

Small pots were filled with screened soil and were planted with equal numbers of sunflower and corn seeds. The pots were watered with tap water as needed until the plants were about six inches high. The pots were then randomly divided into sets of three pots each and treated once on the same date with 200 milliliters of the following:

| Set No. | Treatment |
|---|---|
| 1 | tap water |
| 2 | 300 ppm NH$_4$NO$_3$ in tap water |
| 3 | 50 ppm polyacrylamide with an average molecular weight between 6 million and 10 million and 20-30 percent of its amide groups hydrolyzed |
| 4 | 50 ppm of the polymer of Set No. 3 plus 300 ppm NH$_4$NO$_3$. |

The pots were periodically rotated in their positions to equalize the light and other environmental conditions.

The plants were harvested about 25 days after the treatments by cutting their stems off at the soil level. The roots of the plants were also removed and washed. The excised plants and the roots were dried to constant weight in an oven maintained at 160°F. and samples of the plant and root tissues were analyzed for nitrogen content by the Kjeldahl method and for nitrate nitrogen. The results obtained are set forth in the following tables:

PLANTS

| Set No. | Weight (Grams) | Kjeldahl Nitrogen | Nitrate Nitrogen | Total Nitrogen |
|---|---|---|---|---|
| 1 | 9.9678 | 1.33% | 0.004% | 1.33% |
| 2 | 12.1524 | 1.36 | 0.005 | 1.37 |
| 3 | 10.8680 | 1.31 | 0.004 | 1.31 |
| 4 | 14.6772 | 1.55 | 0.005 | 1.56 |

ROOTS

| Set No. | Weight (Grams) | Kjeldahl Nitrogen | Nitrate Nitrogen | Total Nitrogen |
|---|---|---|---|---|
| 1 | 31.5237 | 0.175% | 0.003% | 0.175% |

| | | | | |
|---|---|---|---|---|
| 2 | 36.2581 | 0.198 | 0.003 | 0.198 |
| 3 | 37.8751 | 0.187 | 0.003 | 0.187 |
| 4 | 37.3159 | 0.209 | 0.003 | 0.209 |

These data reveal that the plants treated with the combination of the water soluble partially hydrolyzed polyacrylamide and the plant nutrient (Set. No. 4) had the greatest plant weight and the highest nitrogen content in the roots and in the above ground portion. The relative increases in plant weights resulting from use of the polymer solution were: 11 percent without the plant nutrient and 20.8 percent with the plant nutrient.

The preceding examples are intended solely to illustrate modes of practice of the invention and to demonstrate results obtainable therewith. It is not intended that the examples be unduly limiting of the invention but, instead, it is intended that the invention be defined by the materials and method steps, and their obvious equivalents, set forth in the following claims.

We claim:

1. The method of retarding the loss of water-soluble fertilizers from highly water-permeable soils having plants growing therein and reducing the quantity of fertilizer dequired for growth of said plants which comprises:
   1. contacting said soil with from 0.05 to 5.0 volumes per pore volume of said soil of an aqueous solution containing a water-soluble, plant nutrient salt selected from the class of ammonium and nitrate salts at a concentration from 0.001 to 5 weight percent and from 0.001 to 0.3 weight percent of a partially hydrolyzed polyacrylamide having a molecular weight from 300,000 to about 15,000,000 and from 7 to 65 percent of its amide groups hydrolyzed to carboxylic acid groups to reduce the water permeability of said soil without rendering said soil impermeable to waterflow; and
   2. thereafter irrigating said soil at periodic intervals as required to maintain the water content of the soil sufficient to prevent wilting of said plants.

2. The method of claim 1 wherein said aqueous solution contains from 0.001 to 0.1 weight percent of said polymer.

3. The method of claim 2 wherein said polymer has from 12 to 45 percent of its amide groups hydrolyzed.

4. The method of claim 2 wherein said treating solution is applied to said soil in an amount from 0.1 to about 2 volumes of solution per pore volume of said soil.

5. The method of claim 1 wherein said solution contains from 0.001 to 5 weight percent of an ammonium salt.

6. The method of claim 1 wherein said solution contains from 0.001 to 5 weight percent of ammonium nitrate.

7. The method of claim 1 wherein said solution contains from 0.001 to 5 weight percent calcium nitrate.

* * * * *